United States Patent [19]
Thelen et al.

[11] 3,882,048
[45] May 6, 1975

[54] SUPPORTED VANADIUM-PALLADIUM-CONTAINING CATALYST

[75] Inventors: Hermann Thelen; Kurt Halcour, both of Krefeld-Bockum; Wulf Schwerdtel, Leverkusen; Wolfgang Swodenk, Odenthal-Globusch, all of Germany

[73] Assignee: Bayer Aktiengesellschaft, Leverkusen, Germany

[22] Filed: Jan. 4, 1973

[21] Appl. No.: 321,111

[30] Foreign Application Priority Data
Mar. 23, 1972 Germany.................... 2214056
Sept. 9, 1972 Germany.................... 2244401

[52] U.S. Cl............. 252/464; 252/466 PT; 260/580
[51] Int. Cl........................................... B01j 11/12
[58] Field of Search.................... 252/464; 260/580

[56] References Cited
UNITED STATES PATENTS
3,207,703   9/1965   Innes et al. .................... 252/464 X
3,240,805   3/1966   Naglieri .................... 252/441 X Primary Examiner—Winston A. Douglas
Assistant Examiner—W. J. Shine
Attorney, Agent, or Firm—Burgess, Dinklage & Sprung

[57] ABSTRACT

Nitrobenzene is reduced to aniline with hydrogen under elevated temperatures and pressure in the presence of a catalyst containing 0.1 to 10 percent by weight palladium and 0.1 to 5 percent by weight vanadium or a compound of vanadium on an aluminum oxide support wherein at least 20 percent thereof has been converted into lithium-aluminum spinel.

4 Claims, No Drawings

SUPPORTED VANADIUM-PALLADIUM-CONTAINING CATALYST

BACKGROUND

This invention relates to a particularly effective supported catalyst containing palladium together with metallic vanadium or vanadium compounds on Li-Al-spinel as supports, and to the use of this new catalyst for reducing nitrobenzene to aniline.

It is known that nitrobenzene can be reduced to aniline by processes both in the liquid and gaseous phases. In the liquid or sump phase, the catalyst is suspended (German Patent No. 951,930). However, it is necessary when working in the sump phase to apply relatively high pressure, and there are also difficulties involved in handling the suspended catalyst which has to be introduced and filtered off again after reduction. Accordingly, it was proposed to carry out the reaction in the gaseous phase. In practice, nickel sulphide has been effectively used as a catalyst (U.S. Pat. Nos. 2,716,135, 2,822,397 and 2,875,158). However, it has been found that, although a nickel sulphide catalyst can be regenerated, regeneration is always accompanied by a reduction in catalytic activity. Accordingly, attempts have been made to obviate this disadvantage. According to DAS No. 1,176,620, the average service time of a nickel sulphide catalyst is 130 hours and, from originally 260–280 hours, finally falls after repeated regeneration to a period of 50 to 60 hours. In contrast, the catalyst according to the present invention has a service time between two regenerations in excess of 1000 hours which is actually increased after regeneration, amounting to 1175 hours after the initial regeneration.

Another major advantage of using the catalyst according to the invention for reducing nitrobenzene into aniline is the high purity of the resulting aniline. By following DAS No. 1,176,620, aniline is obtained in a purity of 99.7% with a nitrobenzene content of less than 0.1% (column 4, lines 5 to 15). Secondary products are formed which generally necessitates a separate complicated purification process. In reproducing the process described in DAS No. 1,176,620, it was found that these secondary products consist essentially of phenol which is known to present considerable difficulties in regard to effluent purification. Also, due to azeotrope formation with the aniline formed during catalytic hydrogenation, the aniline product still contains from 200 to 500 ppm of phenol, even after fine distillation. In contrast, by using the catalyst and the process of the invention, it is possible to obtain an aniline product which is free from detectable quantities of phenol.

The novel catalyst and the outstanding results which can be obtained with it in the reduction of nitrobenzene to aniline must be regarded as particularly surprising, because attempts to use conventional hydrogenation catalysts based on noble metals, for example palladium on aluminium oxide, whether with a large or with a small surface, or for example palladium on lithium-aluminium spinels, for the reduction of nitrobenzene, have resulted in unsatisfactory results both in regard to the service life of the catalyst and in regard to the purity of the resulting aniline, as shown by the comparison examples herein.

SUMMARY

Accordingly, it has been surprisingly found that pure aniline can be obtained by the catalytic reduction of nitrobenzene in the presence of hydrogen in the gaseous phase at an elevated temperature by using a palladium-containing supported catalyst which contains from about 0.1 to about 10% by weight palladium and from about 0.1 to about 5% by weight of vanadium or a vanadium compound on an aluminium oxide at least 20% of which has been converted into Li-Al-spinel.

DESCRIPTION

The catalyst contains palladium in a quantity of from 0.1 to 10% by weight, preferably in a quantity of from 0.1 to 5% by weight, and vanadium or vanadium compounds in a quantity of from 0.1 to 5% by weight, preferably in a quantity of from 0.3 to 1% by weight. The catalyst support is preferably a lithium-aluminium spinel, although spinel formation may optionally even amount to as little as 20%. The specific surface of the Li-Al spinel used is in the range from 20 to 120 $m^2/g$ (BET-method: Brunauer, Emmett and Teller, J. Amer. Chem. Soc. 60, (1938/309); the pore diameters are between about 200 and 800 A (inter alia Ritter and Drake, Int. Eng. Chem., Anal. Ed. 17, (1945) 782–86; Barrett et al., J. Amer. Chem. Soc. 73, (1551) 373–80).

Spinels of this kind can be obtained in known manner by reacting aluminium oxide with compounds of lithium. It is best to start with spherical aluminium oxide in order to obtain supports with high mechanical strength and optimum properties for packing in a fixed bed. However, it is, of course, also possible to use any other type of alumina as starting material. Spinel formation should amount to at least 20%, and preferably up to 100%. It is advantageous to use highly active $Al_2O_3$ with a specific surface of from 200 to 350 $m^2/g$ as starting material for spinel formation. $Al_2O_3$ is impregnated in the usual way with a solution or alternatively with a suspension of a lithium compound. In cases where impregnation is carried out with salts, these preferably are initially transformed to the hydroxide or oxide before calcination.

Spinel formation is then carried out in the usual way by calcination at temperatures of from 900° to 1300°C. The level of the calcination temperature and the calcination time have a decisive influence upon the specific surface of the support. Accordingly, calcination is preferably carried out at temperatures of from 1000° to 1200°C over a period of 6 hours. In any event, the conditions must be so selected that the completed Li-Al-spinel support has a specific surface of from 20 to 120 $m^2/g$ and a pore diameter of from 200 to 800 A.

The catalyst of the invention can also be prepared in accordance with conventional methods by the application of, or impregnation with, a solution of a vanadium compound or by the application of, or impregnation with, a palladium salt solution. The quantity of palladium and vanadium or compound thereof is chosen so that the completed catalyst contains from 0.1 to 10% by weight, preferably from 0.1 to 5% by weight, of palladium and from 0.1 to 5% by weight, preferably from 0.3 to 1% by weight, of vanadium or vanadium compound (expressed as vanadium).

Impregnation of the Li-Al-spinel supporting material with the salt solutions of the two metals can be carried out either simultaneously or successively. Suitable vanadium compounds are known and including both solutions of the oxides (preferably vanadium pentoxide)

and salts (preferably the halides such as the chlorides), vanadates (preferably alkali vanadates) or even organic vanadyl compounds (preferably oxalate, formate, acetate). It is best to use vanadium compounds of the kind which are not only readily available, but are also readily soluble, particularly, in water or organic solvents (lower aliphatic alcohols, ketones, benzene hydrocarbons). Before impregnation with palladium compounds, the vanadium compounds can be fixed by conventional methods, for example by precipitation. In cases where an organic vanadium compound is used, impregnation of the catalyst support with the organic vanadium compound can be followed by tempering (heating to 200°–500°C) in order to destroy the organic residue. Fixing can also be carried out by reduction, optionally together with the palladium salts.

In principle, known palladium compounds (preferably chlorides, chloropalladic acid and its salts) can be used for impregnating the catalyst support with palladium. The reduction of the palladium salt to palladium metal which normally follows can be carried out, for example, with formaldehyde or with hydrazine in alkaline solution or with hydrogen or ethylene at elevated temperature (100° to 200°C), although any other conventional methods of reduction can also be used. In cases where chlorides are used in the production of the new catalyst, the catalyst is subsequently washed free from chlorides with water. Finally the catalyst is dried.

The new catalyst is suitable in particular for the reduction of nitrobenzene into aniline, although other nitrocompounds, for example dinitrobenzenes or dinitrotoluenes, can also advantageously be hydrogenated using the catalysts according to the invention.

For carrying out the process according to the invention, the new catalyst is arranged in a fixed bed and reduction is carried out at temperatures of from 100° to 350°C, preferably at temperatures of from 200° to 300°C, and under pressures of from 1 to 100 bars, preferably under pressures of from 1 to 20 bars. Catalytic reduction can be carried out with dilution with cycled aniline or even other diluents, for example water vapour or nitrogen. The hydrogen is used in at least the stoichiometrically necessary quantity, but preferably in excess, best in a ratio of about 20:1, more particularly 10:1, and may optionally be cycled. The reaction is preferably carried out in the gaseous phase, preferably in a tubular reactor. Basically, it is possible to use any embodiments for gaseous-phase reactions, for example shaft furnaces, fluidised beds. etc. The considerable heat of reaction is preferably used for generating steam, in which case cooling can be carried out either directly by evaporating water or even by a secondary circuit.

If, after having been in service for more than 1000 hours, the catalyst loses some of its activity, the catalyst can be regenerated in the same reactor, i.e. without having to be removed, simply by burning it down (at a temperature of about 200° to 500°C) with air or oxygen optionally containing gases that are inert under the reaction conditions, for example nitrogen or water vapour. The fact that the catalyst according to the invention can be readily and completely regenerated in situ is a very considerable advantage over conventional nickel sulphide catalysts. During their regeneration some of the sulphur present in the catalyst is always converted into sulphur dioxide which leads to corrosion in the hydrogenation apparatus. Sulphur is continuously removed from the catalyst during regeneration through the formation of sulphur dioxide with the result that the catalyst undergoes a loss of activity.

As already mentioned, the service life of the new catalyst after regeneration is not only the same, but is actually increased without any change either in the activity or in selectivity of the catalyst.

The process according to the invention is described by way of example in the following:

Fused nitrobenzene is converted into the gaseous phase in a stream of nitrogen in an evaporator. The molar ratio of hydrogen to nitrobenzene is about 10:1. This gaseous mixture flows with a catalyst load of from 0.2 to 0.6 kg/l. h, preferably 0.4 kg/l.h, upwards through the catalyst fixedly arranged in the tubular reactor at pressures in the range from 1 to 2 bars. The reaction tubes can have an internal diameter of from 30 to 60 mm and, in the case of industrial reactors, are generally 4 to 6 metres long. The cooling jacket, filled with diphenyl or with water under pressure, has a temperature of about 250°C. The diphenyl or water under pressure is passed through a heat exchanger in which secondary vapour is produced by cooling the water under pressure with evaporating condensate. The reaction product (aniline and water of reaction) is condensed from the gas stream leaving the reactor by heat exchange with the starting materials. The residual gas is cycled through a blower.

In the event of a loss of activity, the catalyst can readily be regenerated in situ. For this purpose, the catalyst is successively treated at around 350°C, as described in the Examples, with water vapour, nitrogen/air nitrogen and hydrogen. After some 10 to 20 hours the catalyst is fully active again.

The aniline obtained by the process according to the invention can be used for example as an intermediate product in the production of dyes.

EXAMPLES a. Preparation of the Catalysts

Catalyst No. 1

396 g of formic acid were mixed with 233 g of 45% by weight aqueous lithium hydroxide solution, and water was then added until a solution with an overall volume of 1 litre was obtained. 2.86 litres of spherical γ-alumina with a diameter of 4 to 6 mm and a specific surface of about 250 m²/g were impregnated with the aforementioned solution. The impregnated alumina was dried in a water jet vacuum at 150°C, re-impregnated with 1 litre of the aforementioned solution and then re-dried at 150°C in a water jet vacuum. The resulting supporting material was subsequently calcined for 6 hours at 1050°C, spinel formation taking place to a level of more than 50%, as found by X-ray examination. The finished supporting material had a specific surface of 25 m²/g and an average pore diameter of 700 Å.

4 litres of this supporting material (lithium-aluminium spinel) were impregnated with a solution of 33 g of vanadium (V)-oxide in 1200 ml of a hot (approximately 70° to 90°C) aqueous 20% by weight oxalic acid solution. After drying in a rotary evaporator (70°–100°C/water jet vacuum), the residual mass was impregnated with 1250 ml of an aqueous solution containing 150 g of $Na_2PdCl_4$. This was followed by treatment for some 5 hours with an aqueous solution of 20% by weight of sodium hydroxide and 20% by weight of formaldehyde. The residual catalyst mass was subsequently washed with water until neutral and free from chloride and then dried at 150°C (under normal pressure). The completed catalyst was found by analysis to contain 1.5% by weight of palladium and 0.6% by weight of vanadium.

Catalyst No. 2 (for comparison)

The nickel sulphide catalyst described in DAS No. 1,176,620 was used as catalyst.

Catalyst No. 3 (for comparison)

4 litres of spherical γ-alumina with a diameter of 4 to 6 mm, a specific surface of about 300 m²/g and average pore diameters of approximately 100 A, were impregnated with a solution of 150 g of $Na_2PdCl_4$ in 2000 ml of water (the necessary quantity of water and hence the absorption capacity were determined in the usual way by preliminary tests and the quantity of water measured was selected accordingly in such a way that the entire quantity of palladium salts solution was absorbed). The catalyst mass was then reduced with formaldehyde solution, washed and dried, as described in respect of catalyst No. 1. The finished catalyst contained 1.8% by weight of palladium.

Catalyst No. 4 (for comparison)

3 litres of extruded α-alumina (approximately 5 × 5 mm), with a specific surface of about 15 m²/g and an average pore diameter of approximately 700 A, were treated in the same way as in the production of catalyst No. 3 so that, ultimately, a catalyst containing 1.8% by weight of palladium was obtained.

Catalyst No. 5 (for comparison)

4 litres of the same lithium-aluminium spinel used in the production of catalyst No. 1 were impregnated with a solution containing 150 g of $Na_2PdCl_4$ in 1200 ml of water, in the same way as for the production of catalyst No. 3, and then reduced with formaldehyde solution, washed and dried in the same way as described for that catalyst so that a catalyst containing 1.8% by weight of palladium was again obtained.

b. Description of the Test Apparatus and Test Procedure

The molten nitrobenzene was converted into the gaseous phase in a stream of hydrogen in an evaporator. The gas stream flowed upwards through the catalyst arranged in a fixed bed in the substantial absence of pressure. The tube length was 2.30 metres, the tube diameter 40 mm and the catalyst packing 2 litres. The hydrogenation product (aniline and water of reaction) was condensed from the gas stream leaving the reactor at its upper end.

The nitrobenzene was passed in the gaseous phase through the particular catalyst with a catalyst load of from 0.3 to 0.4 kg/l.h. The molar ratio of hydrogen to nitrobenzene was 11:1. The temperature of the diphenyl-filled cooling jacket amounted to 230°–250°C.

c. Description of In Situ Regeneration

The deactivated catalyst was heated in the same reactor to 320°–350°C; to this end, the addition of hydrogen and nitrobenzene was stopped, and the catalyst was treated for some 4 to 5 hours with approximately 10 kg of water vapour so that the nitrobenzene and aniline content of the condensate amounted to less than 0.02% by weight. This was followed by regeneration at 350°C with 400 litres of nitrogen and 100 litres of air per hour until no more $CO_2$ could be detected in the exhaust gas. Finally, the flow of air was shut off, and the catalyst was cooled to 200°C with 400 litres of nitrogen per hour. After treating for 2 hours with 200 litres of hydrogen per hour, the catalyst was ready for use again. Regeneration of the Nickel-sulphide catalyst no. 20 followed a similar path, except that the formation of $SO_2$ through roasting actually began before the evolution of $CO_2$ had completely ceased, resulting on the one hand in a reduction in activity and on the other hand in corrosion phenomena.

d. Comparison of the Results Obtained

The results obtained by using the various catalysts are set out in the following Table;
catalyst 1 and 1 a according to the invention
catalyst 2, 2 a, 3, 4 and 5 for comparison.
(The letter a denotes regenerated catalyst)

| Catalyst No. | Period in service before deactivation (h) | Θ conversion nitrobenzene % | Θ selectivity based on aniline | Θ secondary products % |
|---|---|---|---|---|
| 1 Pd/V Li-Al-spinel | 1007 | 100 | 100 | none |
| 1 a Pd/V, Li-Al spinel regenerated once | 1175 | 100 | 100 | none |
| 2 for comparison NiSulphide | 550 | 100 | 99.4 | 0.4 % of phenol 0.2 % of benzene |
| 3 for comparison NiSulphide regeneration | 400 | 100 | 99.3 | 0.5 % of phenol 0.2 % of benzene |
| 3 for comparison Pd on γ-$Al_2O_3$ | 220 | 99.1 | 98.1 | 0.2 % of phenol 0.8 % of benzene |

—Continued

| Catalyst No. | Period in service before deactivation (h) | Θ conversion nitrobenzene % | Θ selectivity based on aniline | Θ secondary products % |
| --- | --- | --- | --- | --- |
| 4 for comparison Pd on α-Al$_2$O$_3$ | 190 | 99.8 | 99.7 | 0.1 % of phenol |
| 5 for comparison Pd on Li-Al spinel | 118 | 99.0 | 98.8 | 0.1 % of phenol 0.1 % of benzene |

What is claimed is:

1. Supported catalyst comprising from about 0.1 to about 10 percent by weight of palladium and from about 0.1 to about 5 percent by weight of vanadium or a vanadium compound selected from the group consisting of inorganic vanadium salt and vanadium oxide supported on an alumina at least 20 percent of which has been converted into lithium-aluminum spinel.

2. Catalyst of claim 1 wherein the lithium-aluminum spinel has a specific surface of from 20 to 120 m$^2$/g and an average pore diameter of from 200 to 800 A.

3. Catalyst of claim 1 containing from about 0.1 to about 5 percent by weight of palladium and from about 0.3 to about 1 percent by weight of said vanadium compound.

4. Catalyst of claim 1 containing about 1.5 percent by weight of palladium and about 0.6 percent by weight of vanadium or said vanadium compound supported on lithium-aluminum spinel with a specific surface of 25 m$^2$/g and an average pore diameter of 700 A.

* * * * *